US011277055B2

(12) United States Patent
Iizuka

(10) Patent No.: US 11,277,055 B2
(45) Date of Patent: Mar. 15, 2022

(54) AUTOMOTIVE ALTERNATOR ROTOR

(71) Applicant: Mitsubishi Electric Corporation, Tokyo (JP)

(72) Inventor: Shiro Iizuka, Tokyo (JP)

(73) Assignee: Mitsubishi Electric Cornoration, Tokyo (JP)

( * ) Notice: Subject to any disclaimer, the term of this patent is extended or adjusted under 35 U.S.C. 154(b) by 399 days.

(21) Appl. No.: 16/335,824

(22) PCT Filed: Nov. 2, 2016

(86) PCT No.: PCT/JP2016/082623
§ 371 (c)(1),
(2) Date: Mar. 22, 2019

(87) PCT Pub. No.: WO2018/083759
PCT Pub. Date: May 11, 2018

(65) Prior Publication Data
US 2021/0296962 A1   Sep. 23, 2021

(51) Int. Cl.
*H02K 9/06* (2006.01)
*H02K 1/24* (2006.01)
*H02K 3/52* (2006.01)

(52) U.S. Cl.
CPC .............. *H02K 9/06* (2013.01); *H02K 1/243* (2013.01); *H02K 3/528* (2013.01)

(58) Field of Classification Search
CPC .......... H02K 9/06; H02K 3/528; H02K 1/243; H02K 21/044; H02K 21/048
USPC ....................................................... 310/263
See application file for complete search history.

(56) References Cited

U.S. PATENT DOCUMENTS

| 10,630,146 | B2* | 4/2020 | Iizuka | F04D 29/281 |
| 2006/0261688 | A1 | 11/2006 | Akita et al. | |
| 2013/0039745 | A1 | 2/2013 | Daugaard | |
| 2014/0154086 | A1* | 6/2014 | Chung | F01D 5/3061 |
| | | | | 416/213 A |
| 2014/0368067 | A1* | 12/2014 | Kaizu | H02K 9/06 |
| | | | | 310/62 |

FOREIGN PATENT DOCUMENTS

| CN | 102918276 A | 2/2013 |
| CN | 104696278 A | 6/2015 |

(Continued)

OTHER PUBLICATIONS

Communication dated May 21, 2020 from the State Intellectual Property Office of the P.R.C. in Application No. 201680090382.9.

(Continued)

*Primary Examiner* — Ahmed Elnakib
(74) *Attorney, Agent, or Firm* — Sughrue Mion, PLLC; Richard C. Turner

(57) ABSTRACT

An automotive alternator rotor includes: a pair of magnetic pole cores; a field coil that is disposed on the magnetic pole cores; and a cooling fan that is fixed to the magnetic pole cores. The cooling fan includes: a base portion that is fixed to an axial end surface of the magnetic pole cores; and a plurality of vane portions that protrude axially from the base portion. A jamming suppressing portion that suppresses jamming together of cooling fans when one of the cooling fans is stacked on another of the cooling fans is disposed on the base portion.

4 Claims, 6 Drawing Sheets

(56) References Cited

FOREIGN PATENT DOCUMENTS

| | | |
|---|---|---|
| CN | 106015048 A | 10/2016 |
| JP | 2002-101613 A | 4/2002 |
| JP | 3279258 B2 | 4/2002 |

OTHER PUBLICATIONS

Office Action dated Dec. 4, 2020 in European Application No. 16920580.4.
International Search Report for PCT/JP2016/082623 dated Jan. 10, 2017 [PCT/ISA/210].

* cited by examiner

AUTOMOTIVE ALTERNATOR ROTOR

CROSS REFERENCE TO RELATED APPLICATIONS

This application is a National Stage of International Application No. PCT/JP2016/082623 filed Nov. 2, 2016.

TECHNICAL FIELD

The present invention relates to an automotive alternator rotor that is mounted to a passenger car or a truck, etc.

BACKGROUND ART

In recent years, reductions in external vehicle noise and passenger compartment quieting have advanced, and engine noise has also been reduced. As this has happened, noise from automotive alternators, which are auxiliary machines that rotate at comparatively high speeds, has come to be considered a problem more than ever before. In conventional automotive alternator rotors, as one countermeasure thereto, rib portions that were disposed on base portions and blade portions, which constitute vane portions, of cooling fans have been omitted. Turbulence that arose due to the rib portions when the cooling fans rotated has thereby been suppressed, and air flow has been smoothed (see Patent Literature 1, for example).

CITATION LIST

Patent Literature

[Patent Literature 1]
Japanese Patent No. 3279258 (Gazette)

SUMMARY OF THE INVENTION

Problem to be Solved by the Invention

In conventional automotive alternator rotors such as that described above, since all of the ribs on the cooling fans have been eliminated, indentations and protrusions on the cooling fans, which are formed sheet metal products, are lost, and problems arise such as the cooling fans jamming together and the cooling fans being unable to be extracted one at a time during mass production line manufacturing if the cooling fans are supplied in stacks.

The present invention aims to solve the above problems and an object of the present invention is to provide an automotive alternator rotor that can achieve both quietness and assemblability.

Means for Solving the Problem

An automotive alternator rotor according to the present invention includes: a pair of magnetic pole cores that each include a plurality of magnetic pole claws; a field coil that is disposed on the magnetic pole core; and a cooling fan that is fixed to the magnetic pole core, wherein: the cooling fan includes: a base portion that is fixed to an axial end surface of the magnetic pole cores; and a plurality of vane portions that protrude axially from the base portion; and a jamming suppressing portion that suppresses jamming together of cooling fans when one of the cooling fans is stacked on another of the cooling fans is disposed on the base portion.

Effects of the Invention

In the automotive alternator rotor according to the present invention, because the jamming suppressing portion is disposed on the base portion of the cooling fan, jamming together of cooling fans can be suppressed even if ribs are eliminated, enabling both quietness and assemblability to be achieved.

DESCRIPTION OF EMBODIMENTS

A preferred embodiment of the present invention will now be explained with reference to the drawings.

Embodiment 1

Figure 1:
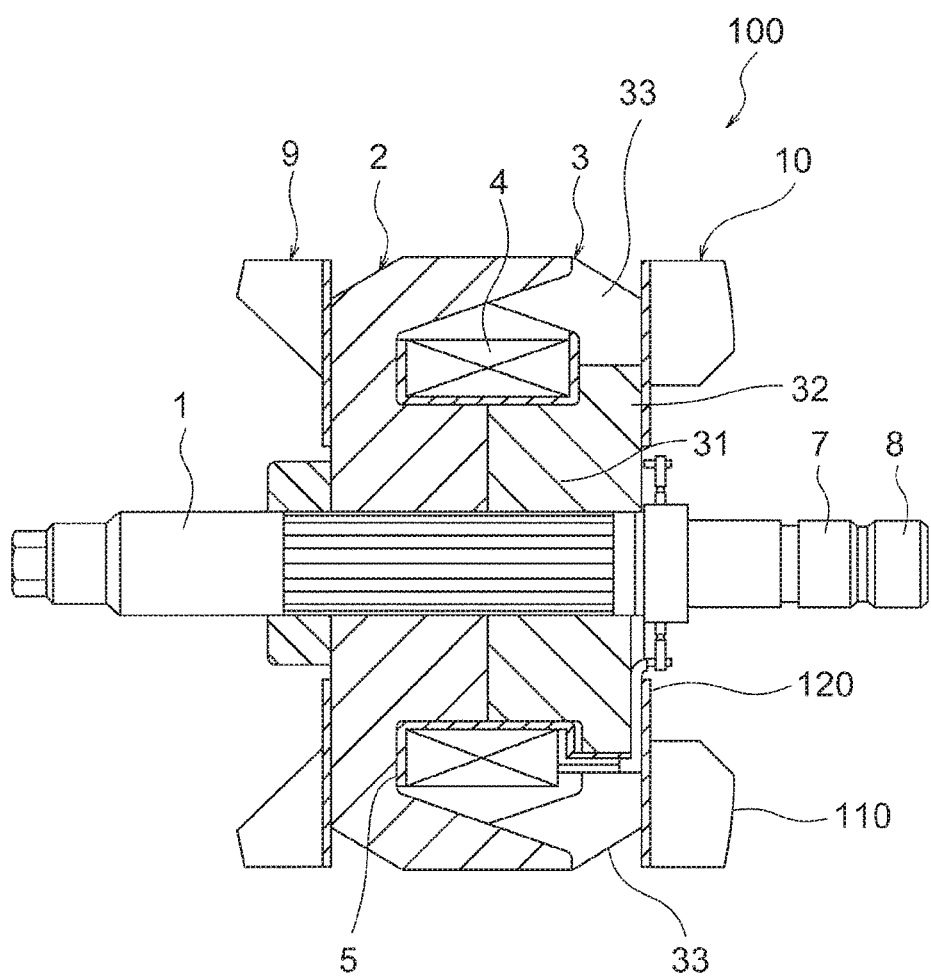
FIG. 1 is a cross section that is taken along a shaft axis of an automotive alternator rotor according to Embodiment 1 of the present invention.

FIG. 1 is a cross section that is taken along a shaft axis of an automotive alternator rotor according to Embodiment 1 of the present invention. In the figure, a rotor 100 is rotatably supported in a frame of an automotive alternator (not shown), and is driven to rotate by an engine that is mounted to a vehicle. The rotor 100 has: a rotating shaft 1; first and second Lundell magnetic pole cores 2 and 3; a field coil 4; a resin bobbin 5; and first and second cooling fans 9 and 10.

The first and second magnetic pole cores 2 and 3 are fixed to the rotating shaft 1, and rotate together with the rotating shaft 1. The field coil 4 is wound onto the first and second magnetic pole cores 2 and 3 so as to have the resin bobbin 5 interposed. The first cooling fan 9 is fixed to an axial end surface of the first magnetic pole core 2 that is positioned at a front end. The second cooling fan 10 is fixed to an axial end surface of the second magnetic pole core 3 that is positioned at a rear end.

The second magnetic pole core 3 has: a cylindrical boss portion 31; a disk portion 32; and a plurality of (eight, for example) magnetic pole claws 33. The boss portion 31 is fixed to the rotating shaft 1. The disk portion 32 is formed integrally with the boss portion 31. The disk portion 32 protrudes radially outward from a first axial end portion of the boss portion 31, that is, an axially outer end portion to which the second cooling fan 10 is fixed.

Each of the magnetic pole claws 33 is formed integrally with the disk portion 32. Each of the magnetic pole claws 33 protrudes axially from an outer circumference of the disk portion 32. Moreover, the first magnetic pole core 2 has an approximately identical shape to that of the second magnetic pole core 3. The first and second magnetic pole cores 2 and 3 are assembled in a state in which the plurality of magnetic pole claws 33 intermesh alternately.

The resin bobbin 5 and the field coil 4 that is wound thereon are accommodated in a space that is surrounded by the boss portions 31, the disk portions 32, and the magnetic pole claws 33 of the first and second magnetic pole cores 2 and 3. A field current is made to flow through the field coil 4 by means of first and second slip rings 7 and 8. The first and second magnetic pole cores 2 and 3 are thereby respectively magnetized such that one forms North-seeking (N) poles, and the other forms South-seeking (S) poles.

Figure 2:
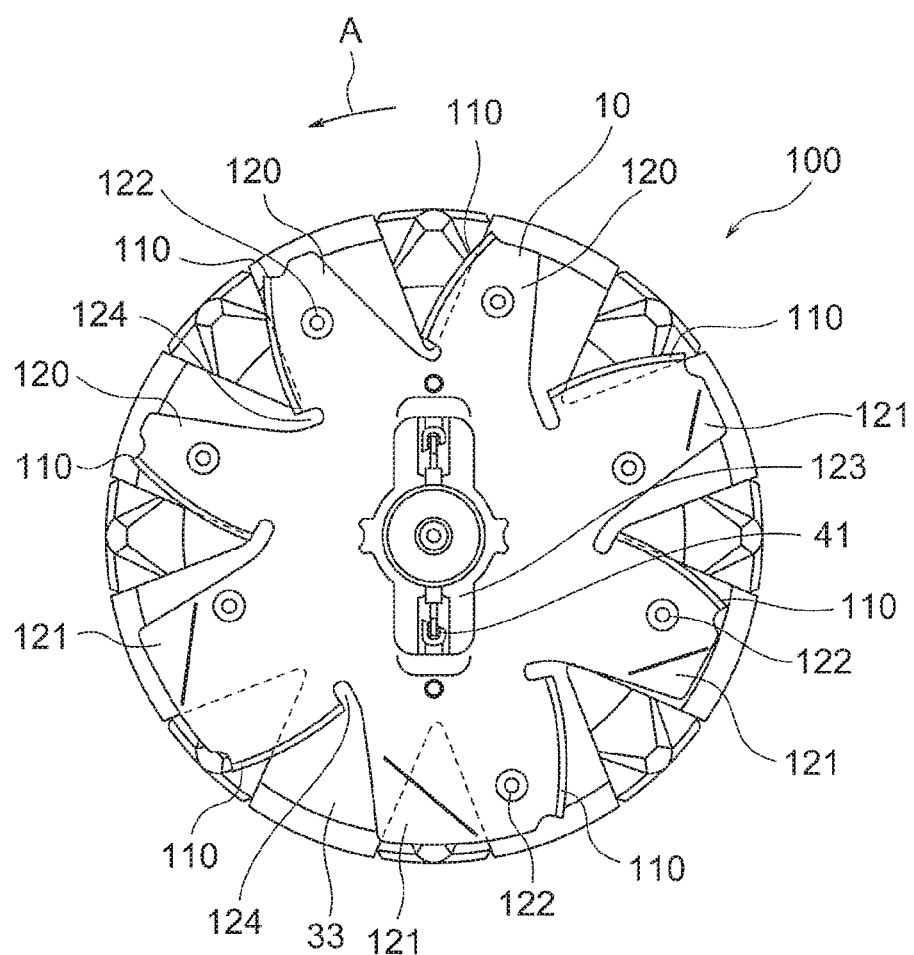
FIG. 2 is a rear elevation in which the rotor in FIG. 1 is viewed from an end near first and second slip rings.

FIG. 2 is a rear elevation in which the rotor 100 in FIG. 1 is viewed from an end near the first and second slip rings 7 and 8. As shown in FIG. 2, the second cooling fan 10 has: a fan base 120 that functions as a base portion that is fixed to the axial end surface of the second magnetic pole core 3; and a plurality of fan blades 110 that function as vane portions that protrude axially from the fan base 120. In this example, seven fan blades 110 are held by the fan base 120.

The fan base 120 is welded to the axial end surface of the second magnetic pole core 3 by weld portions 122 at seven positions, for example. Opening portions 123 for passage of end portions (not shown) of the field coil 4 and portions 41 for connection with the slip rings 7 and 8 are formed at a central portion of the fan base 120.

The fan blades 110 are curved away from the direction of rotation (the direction of arrow A) of the rotor 100 in a radially outward direction. The fan blades 110 are disposed at a non-uniform angular pitch. In addition, root portions of the fan blades 110 are bent so as to be rounded.

By rotating integrally with the rotor 100, the second cooling fan 10 generates a cooling airflow that cools heat-generating portions such as a rectifying apparatus, windings of a stator, etc., that are not shown. Ribs are not disposed on the second cooling fan 10.

Rill-shaped notches 124 are disposed radially inside the fan blades 110 on the fan base 120 (near a central axis) so as to correspond to each of the fan blades 110 with the aim of alleviating stresses when the fan blades 110 are being cut and raised.

A plurality of jamming suppressing portions 121 that suppress jamming together of the second cooling fans 10 when the second cooling fan 10 is stacked with other second cooling fans 10 are disposed on the fan base 120. Each of the jamming suppressing portions 121 is configured by a portion of the fan base 120 being bent and raised in an axial direction.

The jamming suppressing portions 121 are disposed so as to be spaced apart from the root portions of the fan blades 110. In FIG. 2, four jamming suppressing portions 121 that have different sizes are disposed at different positions in a circumferential direction of the fan base 120. In addition, the jamming suppressing portions 121 are disposed on corners of portions of circumferentially outer edge portions of the fan base 120 where the fan blades 110 are separated.

In an automotive alternator rotor 100 of this kind, because the jamming suppressing portions 121 are disposed on the fan base 120, jamming together of the second cooling fans 10 can be suppressed even if ribs are eliminated. Because of that, the second cooling fans 10 can be easily removed one at a time even if supplied in stacks, while reducing noise due to eliminating the ribs. Consequently, both quietness and assemblability can be achieved.

Because each of the jamming suppressing portions 121 is configured by a portion of the fan base 120 being bent and raised in an axial direction, the fan blades 110 and the jamming suppressing portions 121 can be formed simultaneously in a cutting and bending step, making additional portions and separate steps unnecessary.

In addition, because the jamming suppressing portions 121 are disposed so as to be spaced apart from the root portions of the fan blades 110, even if the jamming suppressing portions 121 deform slightly due to stacking the second cooling fans 10 together, the fan blades 110 will not be affected.

Figure 3:
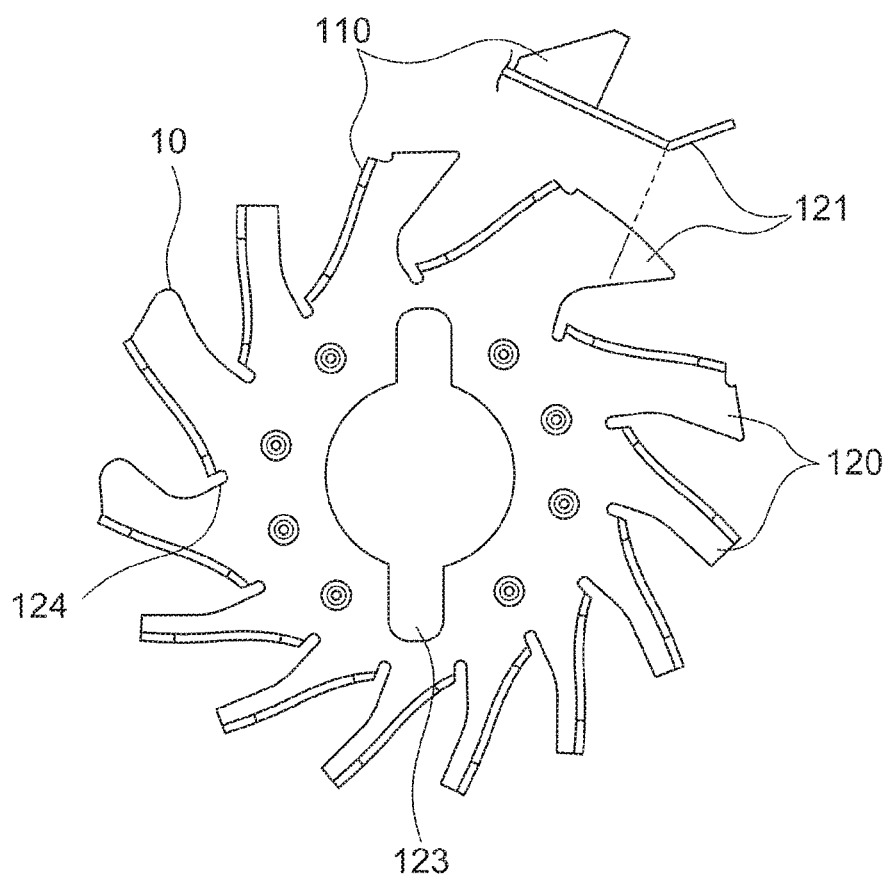
FIG. 3 is a front elevation that shows an example in which a jamming suppressing portion is disposed at only a single position on a second cooling fan.
Figure 4:
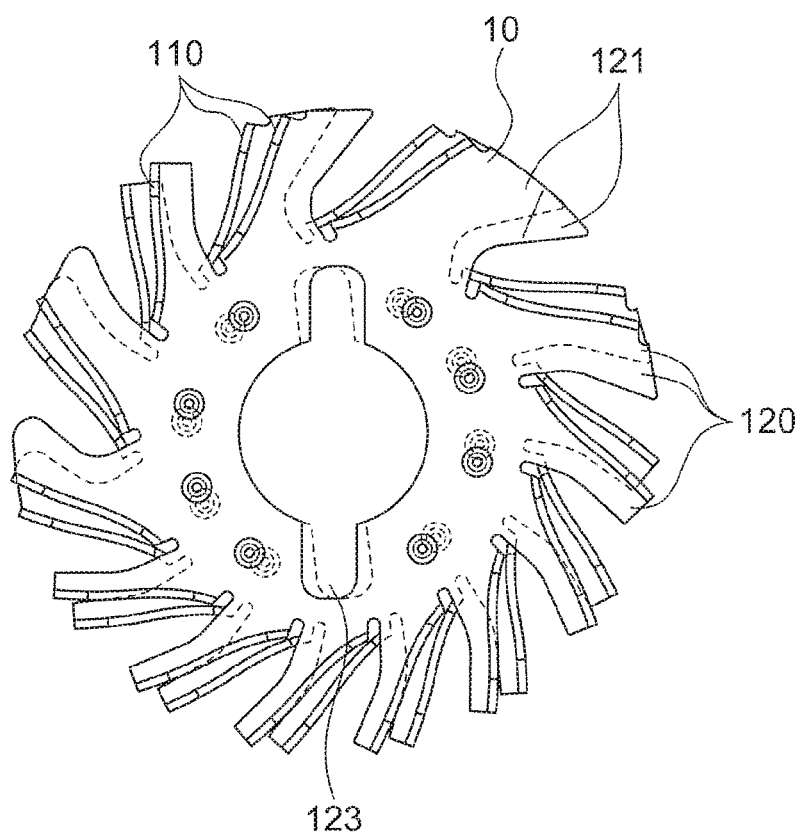
FIG. 4 is a front elevation that shows a state in which the second cooling fan in FIG. 3 is stacked with another second cooling fan.
Figure 5:
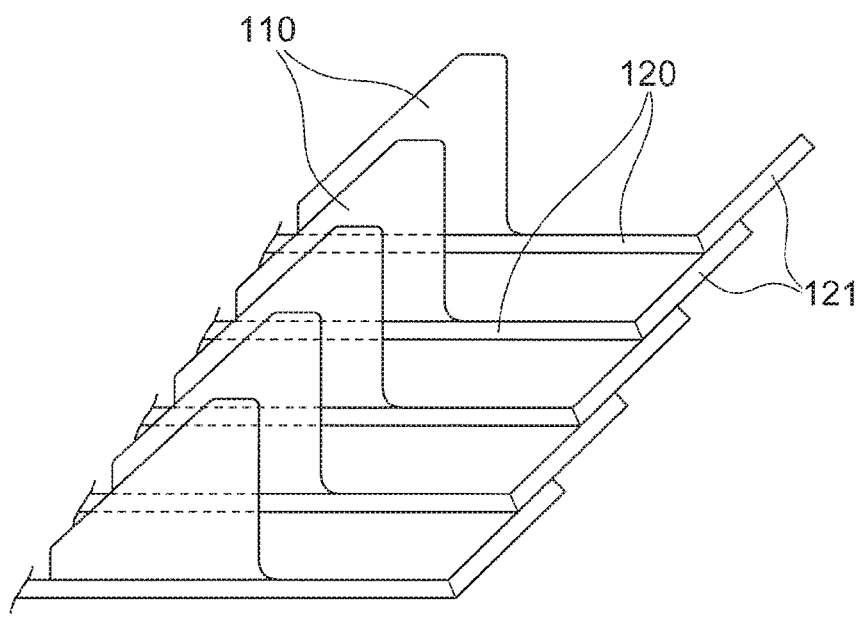
FIG. 5 is a side elevation in which portions on which jamming suppressing portions from FIG. 4 are disposed are viewed laterally.
Figure 6:
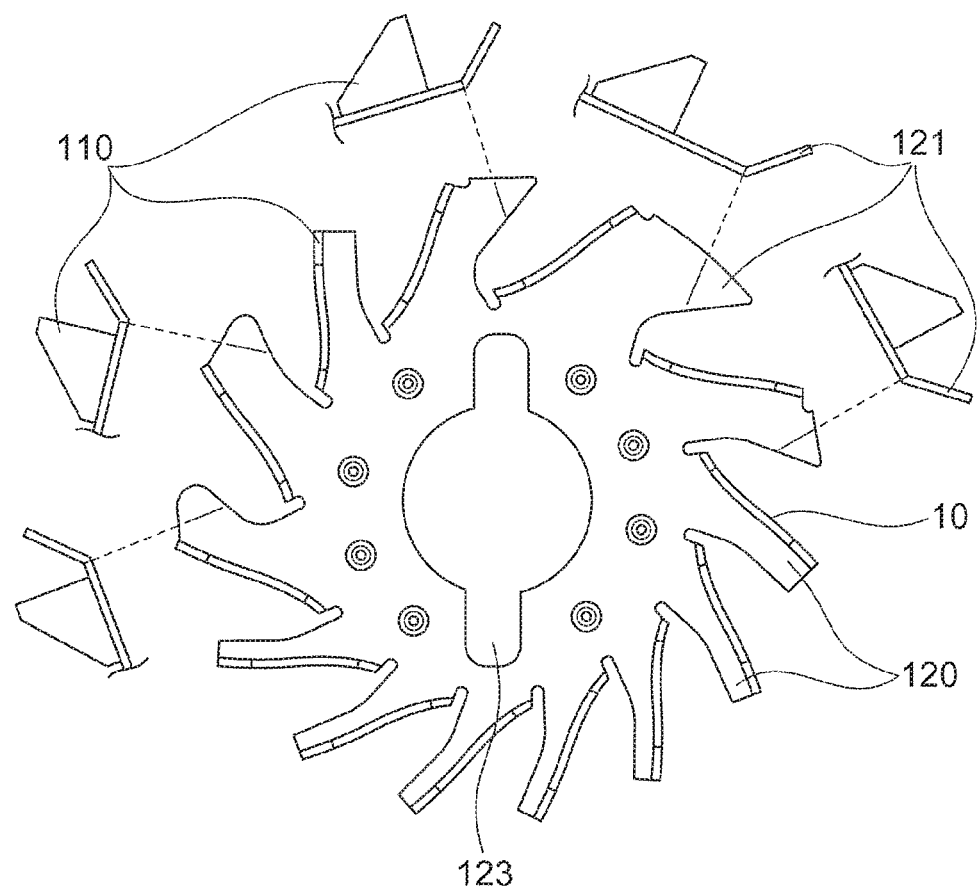
FIG. 6 is a front elevation that shows an example in which jamming suppressing portions are disposed at five positions on a second cooling fan.

FIG. 3 is a front elevation that shows an example in which a jamming suppressing portion 121 is disposed at only a single position on a second cooling fan 10, a lateral view of a fan blade 110 and the jamming suppressing portion 121 also being shown in a top right corner. FIG. 4 is a front elevation that shows a state in which the second cooling fan 10 in FIG. 3 is stacked with another second cooling fan 10, and FIG. 5 is a side elevation in which portions on which jamming suppressing portions 121 from FIG. 4 are disposed are viewed laterally. FIG. 6 is a front elevation that shows an example in which jamming suppressing portions 121 are disposed at five positions on a second cooling fan 10, lateral views of each of the jamming suppressing portions 121 and the fan blades 110 that are adjacent thereto also being shown.

In this manner, a jamming suppressing portion 121 should be disposed at at least one position. Furthermore, by increasing the number of jamming suppressing portions 121, jamming together of the second cooling fans 10 can be more reliably avoided.

Moreover; in Embodiment 1, the second cooling fan 10 has been explained, but jamming suppressing portions may also be disposed on the first cooling fan 9.

In Embodiment 1, fan blades 110 are disposed at a non-uniform angular pitch, but the present invention can also be applied to cooling fans in which fan blades are disposed at a uniform angular pitch.

EXPLANATION OF NUMBERING

2 FIRST MAGNETIC POLE CORE; 3 SECOND MAGNETIC POLE CORE; 4 FIELD COIL; 9 FIRST COOLING FAN; 10 SECOND COOLING FAN; 33 MAGNETIC POLE CLAW; 100 ROTOR; 110 FAN BLADE (VANE PORTION); 120 FAN BASE (BASE PORTION); 121 JAMMING SUPPRESSING PORTION.

The invention claimed is:
1. An automotive alternator rotor comprising:
a pair of magnetic pole cores that each comprise a plurality of magnetic pole claws;
a field coil that is disposed on the magnetic pole core; and
a cooling fan that is fixed to the magnetic pole core,
wherein:
the cooling fan comprises:
a base portion that is fixed to an axial end surface of the magnetic pole core; and
a plurality of vane portions that protrude axially from the base portion;
a plurality of jamming suppressing portions that suppresses jamming together of cooling fans when one of the cooling fans is stacked on another of the cooling fans, disposed on the base portion;
the jamming suppressing portions being disposed at different positions in a circumferential direction of the base portion; and
the jamming suppressing portions being disposed at corners of portions of edge portions of the base portion where the vane portions are separated.

2. The automotive alternator rotor according to claim 1, wherein the jamming suppressing portions are configured by a portion of the base portion being bent and raised in an axial direction.

3. The automotive alternator rotor according to claim 2, wherein the jamming suppressing portions are disposed so as to be spaced apart from the vane portion.

4. The automotive alternator rotor according to claim 1, wherein the jamming suppressing portions are disposed so as to be spaced apart from the vane portion.

* * * * *